(12) United States Patent
Ur (10) Patent No.: US 11,741,159 B2
(45) Date of Patent: Aug. 29, 2023

(54) DIGITAL MEDIA AUTHENTICATION

(71) Applicant: Shmuel Ur Innovation LTD., Shorashim (IL)

(72) Inventor: Shmuel Ur, Shorashim (IL)

(73) Assignee: Shmuel Ur Innovation LTD, Shorashim (IL)

( * ) Notice: Subject to any disclaimer, the term of this patent is extended or adjusted under 35 U.S.C. 154(b) by 323 days.

(21) Appl. No.: 17/075,215

(22) Filed: Oct. 20, 2020

(65) Prior Publication Data

US 2021/0124775 A1 Apr. 29, 2021

Related U.S. Application Data

(60) Provisional application No. 62/927,271, filed on Oct. 29, 2019.

(51) Int. Cl.
*G06F 16/683* (2019.01)
*G11B 27/034* (2006.01)
*G11B 27/10* (2006.01)
*H04N 9/804* (2006.01)

(52) U.S. Cl.
CPC .......... *G06F 16/683* (2019.01); *G11B 27/034* (2013.01); *G11B 27/105* (2013.01); *H04N 9/8042* (2013.01)

(58) Field of Classification Search
CPC ... G06F 16/683; G11B 27/034; G11B 27/105; H04N 9/8042
See application file for complete search history.

(56) References Cited

U.S. PATENT DOCUMENTS

| | | | | |
|---|---|---|---|---|
| 7,333,864 | B1 * | 2/2008 | Herley | G06F 16/683 |
| | | | | 381/58 |
| 10,497,180 | B1 * | 12/2019 | Perfilev | H04L 67/131 |
| 10,997,427 | B1 * | 5/2021 | DeBry | G06K 9/6255 |
| 2011/0205243 | A1 * | 8/2011 | Matsuda | G06F 3/011 |
| | | | | 345/633 |
| 2018/0035234 | A1 * | 2/2018 | Roach | G02B 27/017 |

* cited by examiner

*Primary Examiner* — Mishawn N. Hunter
(74) *Attorney, Agent, or Firm* — Robert Goozner (57) ABSTRACT

A method, system and product including obtaining a media sample of a media stream; retrieving from a database a media record that matches the media sample of the media stream; aligning the media record with the media stream, wherein aligning the media record comprises determining an offset from a start of the media record; comparing the media stream with the media record according to the offset; and upon identifying a semantic deviation between the media stream and the media record, determining that the media stream is semantically manipulated.

19 Claims, 5 Drawing Sheets

DIGITAL MEDIA AUTHENTICATION

CROSS-REFERENCE TO RELATED APPLICATION

This application claims the benefit of provisional patent application No. 62/927,271, entitled "Digital Media Authentication", filed Oct. 29, 2019, which is hereby incorporated by reference in its entirety without giving rise to disavowment.

TECHNICAL FIELD

The present disclosure relates to authenticating digital media in general, and to authenticating a media stream that has a certified copy, in particular.

BACKGROUND

Modern techniques enable to create fake media that looks convincing, using one or more fabrication techniques. Such media can be used to generate fake news, to promote disinformation, or the like.

BRIEF SUMMARY

One exemplary embodiment of the disclosed subject matter is a computer program product comprising a non-transitory computer readable storage medium retaining program instructions, which program instructions when read by a processor, cause the processor to: obtain a media sample of a media stream; retrieve from a database a media record that matches the media sample of the media stream; align the media record with the media stream, wherein aligning the media record comprises determining an offset from a start of the media record; compare the media stream with the media record according to the offset; and upon identifying a semantic deviation between the media stream and the media record, determine that the media stream is semantically manipulated.

Optionally, the semantic deviation comprises a semantic manipulation that alters a meaning of the media record.

Optionally, the semantic deviation is identified by utilizing a semantic classifier to extract a first context of the media record, utilizing the semantic classifier to extract a second context of the media stream, and comparing the first context and the second context.

Optionally, identifying the semantic deviation comprises identifying that the semantic deviation is an outcome of a visual modification to the media record, an auditory modification to the media record, cropping of a portion of the media record, or the like.

Optionally, identifying the semantic deviation comprises determining that the media stream comprises a deepfake variation of the media record.

Optionally, upon determining that the media stream is semantically manipulated, the instructions, when read by the processor, cause the processor to generate an alert to be displayed to a user via a user device.

Optionally, displaying the alert comprises displaying the media record; displaying a portion of the media record that is cropped from the media stream; displaying a notification that the media stream is an alteration of the media record; a combination thereof, or the like.

Optionally, the instructions, when read by the processor, cause the processor to authenticate the media stream upon determining that the media stream and the media record are semantically identical.

Optionally, the determination that the media stream and the media record are semantically identical comprises identifying that the media stream comprises a non-sematic deviation from the media record, wherein the non-sematic deviation comprises at least one of: a resolution level deviation, a volume deviation, an audio quality variation, or a frame rate deviation.

Optionally, the database comprises a certified database retaining certified media, including hardware-certified media, software-certified media, media that was recorded by an authorized recording center, personal media of a person that was certified by the person, or the like.

Optionally, the retrieval of the media record comprises extracting a fingerprint from the media sample, wherein the media stream comprises a real time media stream that is broadcasted in real time, wherein the media sample is extracted from the real time media stream, and matching the fingerprint of the media sample against fingerprints of records in the database, thereby enabling to identify the media record for retrieval.

Optionally, determining the offset comprises: identifying a first location of the media sample within the media record, determining a time elapsed until the media sample was matched to the media record and the media record was retrieved from the database, and determining the offset to be located at a second location, wherein the second location is determined based on the first location and the elapsed time.

Optionally, obtaining the media sample is performed at a sensor comprising a camera, a microphone, or the like.

Optionally, the sensor is integrated as part of a user device operated by a user, wherein said obtain, said retrieve, said align, said compare, and said determine are performed at the user device.

Optionally, the sensor is integrated as part of an augmented reality device worn by a user.

Optionally, said obtain, said retrieve, said align, and said compare are performed at the augmented reality device, wherein the augmented reality device is configured to identify that the media stream is displayed on a screen in a perceived environment of the user.

Optionally, said obtain is performed at an augmented reality device communicating with a server, wherein the augmented reality device is configured to obtain the media stream from the server and add the media stream to an augmented reality stream presented to a user of the augmented reality device.

Optionally, said obtain comprises communicating between a user device and a server to obtain the media stream and rendering the media stream in the user device.

Another exemplary embodiment of the disclosed subject matter is a method comprising: obtaining a media sample of a media stream; retrieving from a database a media record that matches the media sample of the media stream; aligning the media record with the media stream, wherein aligning the media record comprises determining an offset from a start of the media record; comparing the media stream with the media record according to the offset; and upon identifying a semantic deviation between the media stream and the media record, determining that the media stream is semantically manipulated.

Optionally, the semantic deviation comprises a semantic manipulation that alters a meaning of the media record.

Optionally, the semantic deviation is identified by utilizing a semantic classifier to extract a first context of the media record, utilizing the semantic classifier to extract a second context of the media stream, and comparing the first context and the second context.

Optionally, identifying the semantic deviation comprises identifying that the semantic deviation is an outcome of a visual modification to the media record, an auditory modification to the media record, cropping of a portion of the media record, or the like.

Optionally, identifying the semantic deviation comprises determining that the media stream comprises a deepfake variation of the media record.

Optionally, upon determining that the media stream is semantically manipulated, the method comprises generating an alert to be displayed to a user via a user device.

Optionally, displaying the alert comprises displaying the media record; displaying a portion of the media record that is cropped from the media stream; displaying a notification that the media stream is an alteration of the media record; a combination thereof, or the like.

Optionally, the database comprises a certified database retaining certified media, including hardware-certified media, software-certified media, media that was recorded by an authorized recording center, personal media of a person that was certified by the person, or the like.

Optionally, the method comprises retrieving of the media record by extracting a fingerprint from the media sample, wherein the media stream comprises a real time media stream that is broadcasted in real time, wherein the media sample is extracted from the real time media stream, and matching the fingerprint of the media sample against fingerprints of records in the database, thereby enabling to identify the media record for retrieval.

Optionally, determining the offset comprises: identifying a first location of the media sample within the media record, determining a time elapsed until the media sample was matched to the media record and the media record was retrieved from the database, and determining the offset to be located at a second location, wherein the second location is determined based on the first location and the elapsed time.

Optionally, the method comprises obtaining the media sample at a sensor comprising a camera, a microphone, or the like.

Optionally, said obtain, said retrieve, said align, said compare, and said determine are performed at a user device operated by a user, wherein the sensor is integrated as part of a user device.

Optionally, said obtain, said retrieve, said align, and said compare are performed at of an augmented reality device worn by a user, wherein the augmented reality device is configured to identify that the media stream is displayed on a screen in a perceived environment of the user.

Optionally, said obtain is performed at an augmented reality device communicating with a server, wherein the augmented reality device is configured to obtain the media stream from the server and add the media stream to an augmented reality stream presented to a user of the augmented reality device.

Optionally, said obtain comprises communicating between a user device and a server to obtain the media stream and rendering the media stream in the user device.

Yet another exemplary embodiment of the disclosed subject matter is a system comprising a processor and coupled memory, the processor being adapted to: obtain a media sample of a media stream; retrieve from a database a media record that matches the media sample of the media stream; align the media record with the media stream, wherein aligning the media record comprises determining an offset from a start of the media record; compare the media stream with the media record according to the offset; and upon identifying a semantic deviation between the media stream and the media record, determine that the media stream is semantically manipulated.

Optionally, the semantic deviation comprises a semantic manipulation that alters a meaning of the media record.

Optionally, the semantic deviation is identified by utilizing a semantic classifier to extract a first context of the media record, utilizing the semantic classifier to extract a second context of the media stream, and comparing the first context and the second context.

Optionally, identifying the semantic deviation comprises identifying that the semantic deviation is an outcome of a visual modification to the media record, an auditory modification to the media record, cropping of a portion of the media record, or the like.

Optionally, identifying the semantic deviation comprises determining that the media stream comprises a deepfake variation of the media record.

Optionally, upon determining that the media stream is semantically manipulated, the processor is adapted to generate an alert to be displayed to a user via a user device.

Optionally, displaying the alert comprises displaying the media record; displaying a portion of the media record that is cropped from the media stream; displaying a notification that the media stream is an alteration of the media record; a combination thereof, or the like.

Optionally, the processor is adapted to authenticate the media stream upon determining that the media stream and the media record are semantically identical.

Optionally, the determination that the media stream and the media record are semantically identical comprises identifying that the media stream comprises a non-sematic deviation from the media record, wherein the non-sematic deviation comprises at least one of: a resolution level deviation, a volume deviation, an audio quality variation, or a frame rate deviation.

Optionally, the database comprises a certified database retaining certified media, including hardware-certified media, software-certified media, media that was recorded by an authorized recording center, personal media of a person that was certified by the person, or the like.

Optionally, the retrieval of the media record comprises extracting a fingerprint from the media sample, wherein the media stream comprises a real time media stream that is broadcasted in real time, wherein the media sample is extracted from the real time media stream, and matching the fingerprint of the media sample against fingerprints of records in the database, thereby enabling to identify the media record for retrieval.

Optionally, determining the offset comprises: identifying a first location of the media sample within the media record, determining a time elapsed until the media sample was matched to the media record and the media record was retrieved from the database, and determining the offset to be located at a second location, wherein the second location is determined based on the first location and the elapsed time.

Optionally, obtaining the media sample is performed at a sensor comprising a camera, a microphone, or the like.

Optionally, the sensor is integrated as part of a user device operated by a user, wherein said obtain, said retrieve, said align, said compare, and said determine are performed at the user device.

Optionally, the sensor is integrated as part of an augmented reality device worn by a user.

Optionally, said obtain, said retrieve, said align, and said compare are performed at the augmented reality device, wherein the augmented reality device is configured to identify that the media stream is displayed on a screen in a perceived environment of the user.

Optionally, said obtain is performed at an augmented reality device communicating with a server, wherein the augmented reality device is configured to obtain the media stream from the server and add the media stream to an augmented reality stream presented to a user of the augmented reality device.

Optionally, said obtain comprises communicating between a user device and a server to obtain the media stream and rendering the media stream in the user device.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is authenticating digital media such as a video stream, a video file, an audio stream, or the like. In some exemplary embodiments, digital media may be manipulated using one or more media fabrication technologies such as deepfakes (a portmanteau of "deep learning" and "fake"), for example, to modify a content of the digital media, to alter a meaning thereof, or the like. As an example, a video depicting a politician saying a phrase may be manipulated to depict the politician saying a different phrase, e.g., having a different or even an opposite meaning. In some exemplary embodiments, it may be desired to determine if a content of digital media has been manipulated or whether it is authentic and can be relied upon.

In some exemplary embodiments, fabricated media may be misused, for example, for creating fake news, spreading misinformation, performing cyber-attacks concerning national security, stirring racial tensions, or the like. This may be done by depicting one or more people saying things or performing actions that never occurred in reality, such as altering words or non-verbal gestures of a political figure to make it look like he said something which he hasn't.

Another technical problem dealt with by the disclosed subject matter is to determine in real time whether or not displayed content in sight can be relied upon as authentic or not. In some exemplary embodiments, it may be desired to be able to perceive a surrounding environment through a camera, a microphone, a personal device display, a virtual reality headset, or the like, and to determine whether or not elements in sight are authentic or have been tampered with. As an example, a user may encounter a public screen and may desire to know whether or not the content displayed on the public screen is authentic. As another example, a user may view a screen of one or more computerized devices owned by him or owned by any other entity, and may desire to know whether or not the displayed content is authentic. As another example, a user may wear Augmented Reality (AR) glasses and wish to determine whether media in sight is authentic or manipulated.

Yet another technical problem dealt with by the disclosed subject matter is to determine a relation between content of a tampered media to content of the original media. In some exemplary embodiments, upon identifying that a displayed media is an alteration of an original media record, it may be desired to identify whether the alteration is meaningful. For example, it may be desired to conclude whether or not a content of the manipulated video has been semantically modified in a significant way from the content of the original video.

In some exemplary embodiments, media fabrication techniques may be used to combine and superimpose target media over source media, to replace one person with another, to lip-sync a filmed person according to a determined audio, to swap a certain filmed face with another face, or the like. In some exemplary embodiments, media fabrication techniques may be used for generating fake videos in which people are placed in wrong locations, saying things they haven't said, acting in a way they never did, or the like. In some cases, media fabrication techniques may perform human image synthesis, e.g., to show victims saying or doing things that they never said or did. In some exemplary embodiments, different manipulations may include manipulating AR layers which may enable a user to switch between different people captured in an image, to modify faces, switch between captured objects, or the like.

In some exemplary embodiments, since media fabrication techniques may seem authentic, it may be difficult to determine whether or not their content may be trusted, e.g., in real time. In some exemplary embodiments, it may be desired to provide real-time classification of viewable content as authentic or not.

One technical solution provided by the disclosed subject matter may be to obtain a media sample of a digital media stream that is captured by a camera, a microphone, a user device, or the like. In some exemplary embodiments, the media stream, which may be a real-time or live media stream, may comprise an unauthenticated media stream for which an authentication process may be desired. In some exemplary embodiments, a media record that matches the media sample of the media stream may be retrieved from a database, e.g., a certified database of certified media records. In some exemplary embodiments, an alignment between the media record and the media stream may be provided, e.g., by determining an offset from a start of the media record. In some exemplary embodiments, the media stream may be compared with the media record according to the offset, in an aligned manner. In some exemplary embodiments, upon identifying a semantic deviation between the media stream and the media record, the media stream may be determined to be semantically manipulated. In some exemplary embodiments, the semantic deviation may comprise a semantic manipulation that alters a meaning of the media record.

In some exemplary embodiments, a user may be provided with a microphone, a camera, e.g., a phone's built-in camera, or any other sensor, that may be associated with a certified database including a plurality of certified authentic media. In some exemplary embodiments, the camera may capture the media stream, e.g., in real time, or in any other time. In some exemplary embodiments, the microphone may capture the media stream, e.g., in real time, or in any other time. In some exemplary embodiments, the media stream may comprise a real time media stream that is broadcasted in real time, a recorded media stream that is displayed in non-real time, or the like. In some exemplary embodiments, a program or matching software may be configured to match between a media sample of the media stream, e.g., as captured by the camera, and a certified copy of the media stream such as a retained media record in the certified database.

In some exemplary embodiments, the database may comprise a certified database retaining certified media records, files, or the like. In some exemplary embodiments, the certified database may include media records such as movies, advertisements, television shows, or the like, which may be certified as being authenticated unaltered media. In some exemplary embodiments, the certified media may comprise hardware-certified media, software-certified media, media that was recorded by an authorized recording center, personal media of a person that was certified by the person, or the like.

In some exemplary embodiments, in case a match is found between the media sample and the media record of the database, the media record, portions thereof, or metadata thereof may be extracted from the certified database for further processing. In case no match is found between the media sample and the media record, subsequent media samples of the media stream may be continuously or periodically obtained and compared to the certified database, until the media stream is terminated. In some exemplary embodiments, the retrieval of the media record may comprise extracting or generating a fingerprint for the media sample. In some exemplary embodiments, the fingerprint may be configured to uniquely identify or represent the media sample. In some exemplary embodiments, the fingerprint of the media sample may be matched against fingerprints of media records in the database, thereby identifying the media record for retrieval.

In some exemplary embodiments, upon obtaining the media record from the certified database, it may be desired to determine whether or not the media stream, as depicted in the media sample, has been modified in a meaningful way from the media record.

In some exemplary embodiments, to enable a comparison between the media sample and the media record, an offset of the media record may be determined for finding the current location of the displayed media stream compared to the beginning of the media record, thereby obtaining a first location of the media sample within the media record. In some exemplary embodiments, a time elapsed until the media sample was matched to the media record and until the media record was retrieved from the database may be determined. In some exemplary embodiments, the offset may be determined to indicate a second location, which may be determined based on the first location of the media sample and the elapsed time. For example, the offset may be set to indicate a location that corresponds to a sum of the first location and the elapsed time. In some exemplary embodiments, an AR device worn by a user, or any other user device, may identify that the media stream is displayed to the user, obtain the media stream, retrieve the corresponding media record, and align them both so that a comparison may be made.

In some exemplary embodiments, the semantic deviation may be identified by utilizing a semantic classifier to extract at least one first context of the media record, and at least second context of the media stream. In some exemplary embodiments, a media context may refer to a sematic meaning of a media portion, a title of a media portion, a topic of a depicted conversation, an emotional context, or any other attribute that may be extracted from a media file and may at least partially describe a content of the media file. In some exemplary embodiments, the context description may be generated as an injective function, a one-to-one function, a hash function, or the like, so that a same media portion cannot result with a different context description. In some exemplary embodiments, the first context and the second context may be compared, e.g., to identify any semantic differences. In some exemplary embodiments, the comparison may be performed by comparing context tags, comparing context parameters, comparing the context descriptions, or the like. In some exemplary embodiments, identifying the semantic deviation may comprise identifying that the semantic deviation is an outcome of a visual modification to the media record, an auditory modification to the media record, cropping of a portion of the media record, or the like.

In some exemplary embodiments, the media stream may be authenticated upon determining that the media stream and the media record are semantically identical. In some exemplary embodiments, the determination that the media stream and the media record are semantically identical may comprise identifying that the media stream comprises a non-sematic deviation from the media record, or that the media stream is identical to the media record. In some exemplary embodiments, the non-sematic deviation may comprise a resolution level deviation, a volume deviation, an audio quality variation, a frame rate deviation, a phrasing deviation that does not make a semantic difference, or any other non-semantic deviation. For example, in case one media file has a lower resolution level then the other, is played in slow mode than the other, or the like, the difference between them may be considered insignificant, e.g., a non-semantic deviation. In some exemplary embodiments, a phrasing deviation may not be considered a semantic deviation, e.g., depending on whether or not a meaning or context of the media record has shifted. In some exemplary embodiments, identifying the semantic deviation may comprise determining that the media stream may comprise a deepfake variation of the media record, a fabricated variation thereof, or the like, that semantically manipulates the media.

In some exemplary embodiments, in case it is determined that the media stream is semantically manipulated, a responsive action may be performed. For example, a fraud alert may be generated to be displayed to the user by a display device, e.g., AR glasses, a Smartphone, or the like. In some exemplary embodiments, displaying the fraud alert may comprise providing a link to the media record, providing a link to a portion of the media record that was modified in the media stream, displaying a portion of the media record that is cropped from the media stream, displaying a notification that the media stream is an alteration of the media record, or the like.

In some exemplary embodiments, in case it is determined that the media stream is not manipulated, the media stream may be authenticated. For example, an authenticating notification may be generated to be displayed to the user by a display device. In some exemplary embodiments, the media stream may be determined to be authenticated upon examining the entire media stream.

One technical effect of utilizing the disclosed subject matter may be to authenticate a media stream. In some exemplary embodiments, the disclosed subject matter enables a user to identify in real time an authentication of a media stream that has an authenticated copy in a certified database. In some exemplary embodiments, detected manipulations of the media stream may invoke an appropriate alert or warning.

Another technical effect of utilizing the disclosed subject matter is to verify that filmed people will not be taken out of context. In some cases, upon detecting manipulations of the media stream that alter an intention of the original media file, a corresponding portion of the original media file may be suggested or provided to the user, e.g., along with an alert.

Yet another technical effect of utilizing the disclosed subject matter is enabling a user to film any screen or environment and receive an alert in real time if a fabricated media file is detected.

Figure 1:
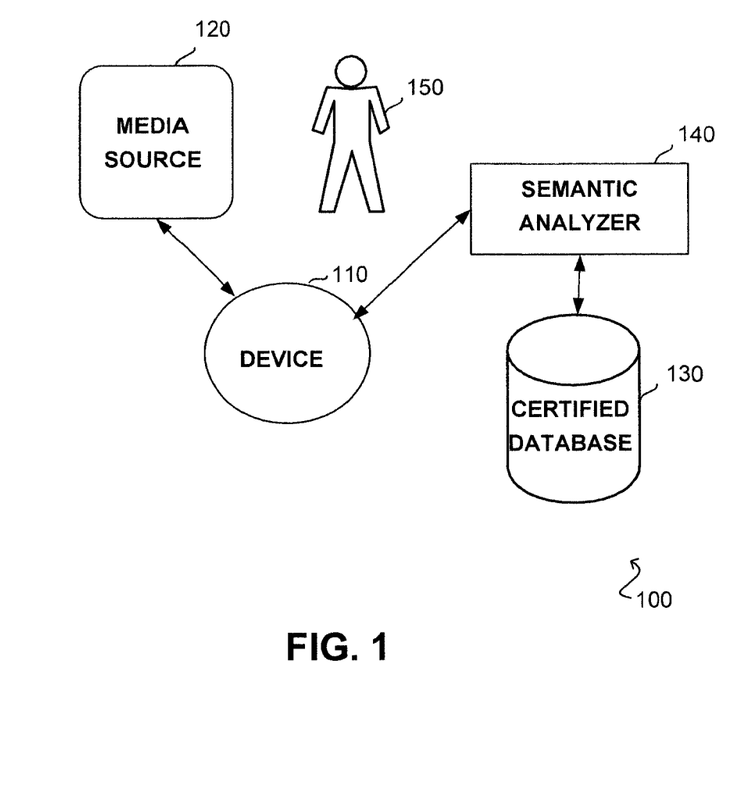
FIG. 1 shows a schematic illustration of an exemplary environment and architecture in which the disclosed subject matter may be utilized, in accordance with some exemplary embodiments of the disclosed subject matter.

Referring now to FIG. 1 showing an illustration of a computerized environment, in accordance with some exemplary embodiments of the disclosed subject matter.

In some exemplary embodiments, Environment 100 may comprise a Device 110 operated by User 150. In some exemplary embodiments, Device 110 may be a smartphone, a smartwatch, a tablet, a Personal Computer (PC), an AR device such as augmented reality glasses, a wearable device, a non-wearable device, or the like. In some exemplary embodiments, Device 110 may comprise an Operating System (OS), a processor, a receiver, a transmitter, a memory, a network interface, or the like. Device 110 may be used for displaying, obtaining, or the like, one or more digital media streams such as audio communications, video communications, voice messages, or the like, and authenticating them.

In some exemplary embodiments, Media Source 120 may be a provider of the media stream such as a server communicating with Device 110, a displaying screen in a perceived environment of User 150 displaying media streams that can be captured by a sensor associated with Device 110, or the like. Device 110 may be connected to a network, for example, through a BLUETOOTH™ connection, a WIFI™ connection, a local cellular connection, a Local Area Network (LAN), a Wide Area Network (WAN), or the like, and may obtain the media stream from a server via the network, communicate with a capturing sensor via the network, or the like. In some exemplary embodiments, one or more applications, browsers, or the like of Device 110 may obtain the media stream from the server. In some exemplary embodiments, Media Source 120 may be a digital media displayer such as television screen displaying content, e.g., publicly or privately, which may be captured by Device 110 such as via a camera (not illustrated).

In some exemplary embodiments, Device 110 may obtain the media streams directly, e.g., in case Media Source 120 is a network node, a server, or the like. In some exemplary embodiments, Device 110 may communicate with Media Source 120 via one or more communication modules, and retrieve therefrom a media stream. As another example, Device 110 may include an augmented reality device worn by User 150 such as AR glasses, which may include a communication sensor, module, or the like. According to this example, Device 110 may obtain the media stream via the communication module and add the media stream to an AR stream that may be displayed to the user in one or more AR layers.

Alternatively, Device 110 may obtain the media streams indirectly, e.g., via capturing sensors such as a camera or microphone capturing the media stream displayed by Media Source 120 in a perceived environment of User 150. In some exemplary embodiments, the sensors may be operated by User 150 and may be integrated as part of Device 110, attached to Device 110, separate from Device 110, or the like. For example, the sensors may include an embedded camera of Device 110, an embedded microphone of Device 110, or the like. As another example, Device 110 may include an augmented reality device worn by User 150 such as AR glasses, and the sensors may be integrated as part of the AR glasses so that the AR glasses are enabled to capture the media stream, render the media stream to be displayed as part of an AR stream, authenticate the media stream, or the like. In some exemplary embodiments, the sensors may be independent from Device 110, and may be integrated as part of a separate camera, a separate wearable device, separate AR glasses, or the like. In such cases, the sensors may capture the media stream and provide the captured data to Device 110 for further processing, e.g., via one or more communication modules such as a wired or wireless connection.

In some exemplary embodiments, upon obtaining the media stream, Device 110 may search for a media record matching the captured media stream, a media sample thereof, or the like, in Certified Database 130. In some exemplary embodiments, Certified Database 130 may comprise a corpus of certified media such as certified videos, audios, or the like, which may be hardware certified, software certified, or the like. In some exemplary embodiments, Certified Database 130 may be located at Device 110. Alternatively, Certified Database 130 may be located at a server, a cloud network, or the like, and may be accessible to Device 110 so that Device 110 is enabled to find a matching record for the media stream, e.g., if existing.

In some exemplary embodiments, upon finding a corresponding media record, Device 110 may align the record to the media stream and utilize a Semantic Analyzer 140 to compare a semantic meaning of the media stream to the original semantic meaning of the media record. In some exemplary embodiments, Semantic Analyzer 140 may determine whether the media stream comprises a semantic alteration of the media record, thereby changing a meaning of the media record, a context thereof, or the like, e.g., by extracting and comparing contexts of the medias. In some exemplary embodiments, Semantic Analyzer 140 may be located in Device 110, or alternatively, Semantic Analyzer 140 may be located outside of Device 110 such as at a server, a different computing device of User 150, or the like.

In some exemplary embodiments, Device 110 may display to User 150 an indication of the classification result from Semantic Analyzer 140. In some exemplary embodiments, in case no semantic deviation is identified by Semantic Analyzer 140, the indication may include a notification indicating that the media stream is authenticated, e.g., upon going over the entire media stream and identifying that the media stream terminated. In some exemplary embodiments, in case a semantic deviation is identified by Semantic Analyzer 140, the indication may include a notification indicating that the media stream is fabricated, e.g., prior to a termination of the media stream, upon a termination of the media stream, upon identifying the fabrication, or the like.

Figure 2:
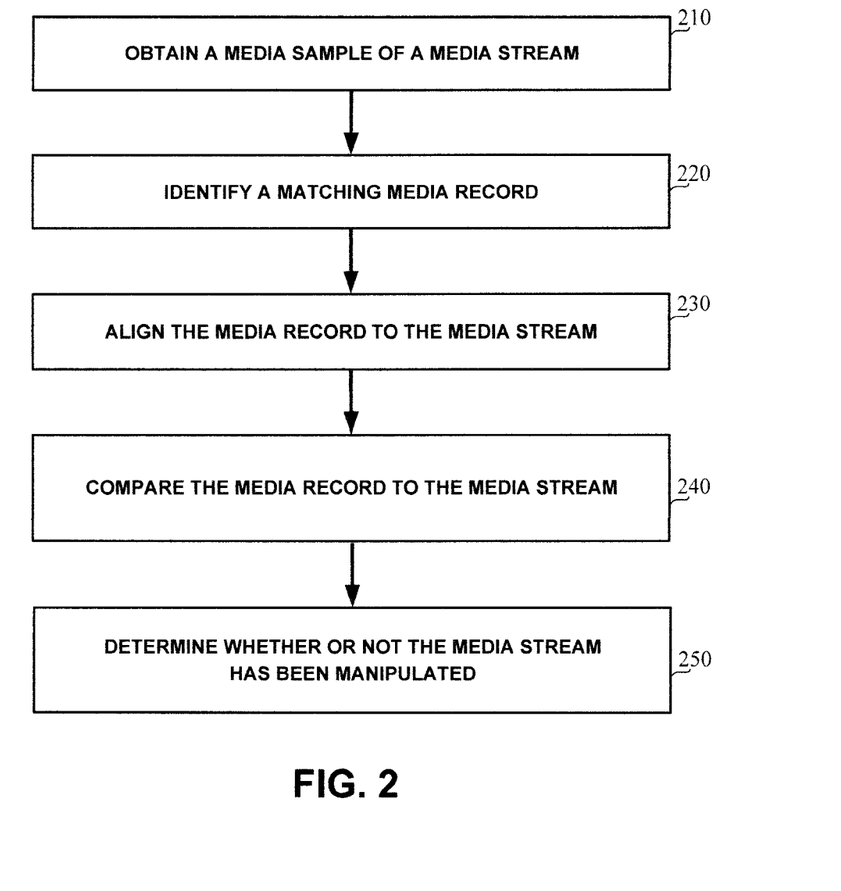
FIG. 2 shows a flowchart diagram of a method, in accordance with some exemplary embodiments of the disclosed subject matter.

Referring now to FIG. 2 illustrating a flowchart diagram of a method, in accordance with some exemplary embodiments of the disclosed subject matter.

On Step 210, a media sample of a media stream may be obtained. In some exemplary embodiments, the media sample may be obtained, for example, by filming with a camera a natural environment, a television display, a virtual reality environment, or the like, by recording with a microphone a real-life or virtual sound, or the like. In some exemplary embodiments, the media sample of the digital media stream may be obtained from a device used to play the media stream, such as by a camera capturing the display from a screen, or the like. In some exemplary embodiments, a built-in phone camera or any other camera may be used to capture one or more media samples of the media stream of interest. As an example, the media sample of the digital media stream may be obtained during a real time football game by filming with a camera a public screen displaying the football game. As another example, the media sample of the digital media stream may be obtained from a movie stream that may be displayed on a screen of a computing device such as a Smartphone, e.g., via a browser, an application, or the like.

In some exemplary embodiments, the media sample of the real time media stream may be captured automatically without user intervention, e.g., from a streaming application or browser. In some exemplary embodiments, the media sample of the real time media stream may be captured in response to a user activating a button or other control to trigger the sample capturing. In some exemplary embodiments, the media stream may be stored on a computing device, captured in real time, received from external sources such as a broadcast, or the like.

On Step 220, a matching media record may be identified. In some exemplary embodiments, based on one or more media samples, it may be determined whether or not a corresponding media record is retained in the certified database. In some exemplary embodiments, the media samples may be analyzed to identify a corresponding media record in the certified database, e.g., based on a corresponding fingerprint that may be generated or created for the sample and for each certified media record. In some exemplary embodiments, the media sample may be compared to records in the certified database, e.g., to determine whether they relate to a same original media file.

In some exemplary embodiments, the certified database may comprise media records that are certified, e.g., objectively, such as by a certification entity, by a certifying software configured to detect media fabrications, or the like. Additionally, or alternatively, the certified database may comprise media records that are considered certified in a subjective manner, such as a personal database that is certified by the depicted person. For example, a user may upload original media of himself to the personal database, and certify the media as authentic himself. In some exemplary embodiments, the records uploaded by the person may be considered as certified, even though the person may have altered them before uploading them, e.g., unless a higher level of certification indicates otherwise.

In some exemplary embodiments, only media that is determined to be authentic may be added to the certified database. In some exemplary embodiments, in order to determine that media is authentic, the media may be created or generated in a certified form. As an example, special hardware, special locations, or the like, may be used to determine that the media record is authentic. In some exemplary embodiments, some media records may have a hardware certification, e.g., implemented at a recording stage, indicating that they really were recorded. In some exemplary embodiments, hashing and signing technologies may be integrated into a recording application or onto a firmware of a recording device. In some exemplary embodiments, some recording centers may be certified as secure recording centers, media recorded by a large number of people may be determined to be certified, large companies may certify clips or videos, or the like. In some cases, characteristics of the media itself may be examined, e.g., to detect therein artifacts, abnormal compression signatures, camera or microphone noise patterns, or the like, which may indicate the media is forged. In some exemplary embodiments, aside from the characteristics of the data, the media's metadata may be analyzed, behavioral pattern analysis may be performed on the subjects depicted by the media, or the like. In some exemplary embodiments, the certified database may include media record that are certified in any other manner or method.

In some exemplary embodiments, media records may be added to the certified database based on one or more authentication schemes used to identify whether the media is authentic or fabricated. In some exemplary embodiments, uploading records to the database may or may not be performed using a standard signature, a cryptographic signature, or any other authentication scheme, which may be configured to verify that the media was not tampered with. In some cases, in order to ensure the media is authentic, the media may be signed with a digital signature. In some exemplary embodiments, media records that were found to be authentic may be added to the database, while media records that were found to be forged, e.g., in a probability overpassing a threshold, may not be added to the database.

In some exemplary embodiments, each media record of the database may be processed, e.g., prior to being added to the database or later, to map a collection of features thereof to one or more small strings of text, or "fingerprints" of the media record. In some exemplary embodiments, a fingerprint of a media record may uniquely identify the media record throughout the life of that record, and may be used to initially identify the record using the fingerprint instead of scanning all of the media records. Alternatively, any other compression technique may be used to uniquely identify each media record of the database (the result thereof is referred herein as a fingerprint). In some exemplary embodiments, the associated fingerprints of the database may be stored in the same database or separately, such as in a separate database, repository, cloud, or the like.

In some exemplary embodiments, a media record that matches the media sample may be searched for in the certified database. In some exemplary embodiments, matching between the media sample and the media record may be performed by creating a key, fingerprint, or the like, from the media sample and comparing the generated fingerprint with existing fingerprints of the certified records. In some exemplary embodiments, the fingerprint of the media sample may be generated to uniquely identify the media sample or the media stream, e.g., using one or more compression algorithms or techniques. In some exemplary embodiments, the fingerprint of the media sample may be compared to fingerprints of records from the certified database, e.g., for detection of a matching media record. Some techniques for media matching are disclosed in U.S. Patent Application 2014/0360343 by Avery Li-Chun Wang, entitled "Methods and Systems for Disambiguation of an Identification of a Sample of a Media Stream", and in U.S. Pat. No. 8,625,033 by Marwood et al, entitled "Large-scale matching of audio and video", both of which are hereby incorporated by reference in their entirety without giving rise to disavowment.

In some exemplary embodiments, when generating the fingerprint of the media sample, one or more noise reduction techniques or image processing techniques may be used to eliminate or reduce therefrom background noises, environment noises, resolution differences, speakers, lights, flashes, hand movements of a user capturing the media sample, or the like.

In some exemplary embodiments, using the fingerprint of the media sample, initial matching to a media record may be performed. In some exemplary embodiments, based on the initial matching, the exact media record may be obtained, enabling a more accurate and delicate comparison of the media sample with the certified records. In some exemplary embodiments, upon identifying a matching media record, the media record may be extracted or obtained for further processing. In some exemplary embodiments, the matching media record may be a media that is identical in its essence to the media stream, although it might not be identical due to fabrications which may be performed to the media stream.

For example, a media sample of a media stream may be corresponded to a record of a movie, e.g., the "Lion King" movie, since an identified portion of the stream may be uniquely be related to the "Lion King" movie. Although both files may be essentially identical, by having one or more same unique identifiers that correspond only to the "Lion King" movie, some portions of the media stream may not match the "Lion King" movie, e.g., since the media stream may be corrupted in those portions.

On Step 230, the media record may be aligned with the media stream. In some exemplary embodiments, upon finding the corresponding media record on Step 220, time offsets of the media record may be identified, e.g., in order to align the media stream with the media stream. In some exemplary embodiments, the captured media sample may be identified at a certain time position in the media record. In some exemplary embodiments, to enable a continuous or periodical real time comparison between the media sample and the media record, an offset of the media record may be determined for finding the location of the displayed media stream with respect to the start of the media record. In some exemplary embodiments, the offset may be determined based on the location of the media sample within the media record and the elapsed time until the media sample was matched to the media record and until the media record was retrieved from the database, e.g., based on a sum of both timeframes. In some exemplary embodiments, the retained media record may be correlated and aligned to the time of the media stream based on the determined offset.

For example, a perceived frame in a streamed baseball game may match a frame of a retained video record at time 00:04:02 (four minutes and two seconds) of the retained record. Finding the media record and retrieving the record may take two additional seconds. Accordingly, the real time media stream captured by the camera may be compared to the media record from moment 00:04:04 (a result of the sum of 00:04:02 and 00:00:02) and onwards.

On Step 240, the media record may be compared to the media stream. In some exemplary embodiments, upon identifying the offset of the media record, a comparison may be performed continuously or periodically, in real time, or the like, between the media record, starting from a location indicated by the offset, and between the media stream. In some exemplary embodiments, the comparison may be made in a synchronized manner between the media stream, captured by the user device, and the matching media record. In some exemplary embodiments, the comparison may be performed by further playing the media record from the determined offset, e.g., thereby aligning the real time media stream from the camera with the matching media. In some alternative embodiments, in case a different frame rate or playback speed is identified between the streams, the media record may be played in a corresponding speed. For example, in case the media stream plays a movie in slow mode, the media record may be compared in a similar frame rate so that the streams will correspond. In some alternative embodiments, the comparison may be performed by comparing frames or portions of the media record file without replaying the media record. In some alternative embodiments, the comparison may be performed by comparing extracted contexts of segments of the media record to extracted contexts of the media stream, e.g., without replaying the media record.

In some exemplary embodiments, the comparison may be configured to identify any semantic deviation, e.g., utilizing one or more sematic classifiers, voice-to-text translators, Natural Language Processing (NLP) classifiers, visual classifiers, or the like. In some exemplary embodiments, the semantic analysis may extract and compare contexts of media record and the media stream based on one or more media analysis algorithms and techniques such as Video Content Analytics (VCA), data-driven classifiers, heuristic classifiers, or the like. In some exemplary embodiments, a media context may refer to a sematic meaning of a media portion, a title of a media portion, a topic of a depicted conversation, an emotional state depicted in the media, or any other descriptive attribute that may be extracted from a media file and may at least partially describe the media file, e.g., a visual or audio aspect thereof. In some exemplary embodiments, a semantic classifier may be trained to detect quotes, positive or negative statements, topics of conversion, emotional states, identified object types and corresponding behavior, or the like. In some exemplary embodiments, the semantic classifier may convert the audio to text, e.g., using one or more translators, and analyze the text based on one or more text processing tools, e.g., using NLP techniques or any other text processing technique. In some exemplary embodiments, the semantic classifier may identify non-textual semantic meanings of media portions, such as identity changes, mood changes, non-verbal gestures, or the like. For example, a depicted person that is modified in a manipulated media stream to wink or raise eyebrows, may be identified as a non-textual semantic deviation that may alter a meaning of the media.

In some exemplary embodiments, the semantic deviation may be identified by utilizing a semantic classifier to extract at least one first context of the media record, and at least second context of the media stream. In some exemplary embodiments, the context description may be generated as an injective function, a one-to-one function, a hash function, or the like, so that a same media portion cannot result with a different context description. For example, a context of the sentence "I want to eat a hotdog" may be described as "hotdog=positive", "hotdog=action: eat", and/or "food=positive". In case the sentence is semantically altered, such as by modifying the sentence with the denoted underlined phrase "I don't want to eat a hotdog", the context may be described as "hotdog=negative", "hotdog=action: not eat", and/or "food=negative".

In some exemplary embodiments, the first context of the media record and the second context of the media stream may be compared, e.g., to identify any semantic differences.

In some exemplary embodiments, the comparison may be performed by comparing context tags, comparing the context descriptions, or the like. For example, a video may depict a person named Alice while saying "Bob said "I want to kill my dog" but I told him he might get into trouble". The video may be altered to show only a portion of the video in which the Alice quotes Bob and says, "I want to kill my dog". According to this example, based on a semantic analysis, a person viewing the altered movie may be provided with a warning notification such as "the original video has an ending that changes this meaning. Are you interested in watching the original ending?", or "the viewed movie is a quote portion of the original movie". In some exemplary embodiments, the warning may be provided with a link or an attachment of the original portion of the media record that is missing, to the entire media record, or the like.

In some exemplary embodiments, a deep learning technique may be utilized to determine whether a semantic meaning of two overlapping media files has been altered. In some exemplary embodiments, a machine learning classifier may be trained based on a dataset including a tagged media corpus. In some exemplary embodiments, the dataset's media may be cropped or separated to different segments. In some exemplary embodiments, the segments may be created, e.g., manually or automatically, according a content of the segment, a context thereof, a meaning thereof, or the like. In some exemplary embodiments, a semantic analysis may be executed on the segments in order to tag them according to their semantic meaning. For example, a segment of a movie may be tagged as "positive conversation about character X", "topic=argument", or the like. In some exemplary embodiments, key segments and variations thereof may be tagged or labeled automatically or by human operator. Additionally, or alternatively, key frames in which a semantic meaning or any other meaning is changed in a significant manner, may be tagged automatically or manually. The tagging process may be performed for a large corpus of different media files to provide a significant training dataset for the classifier, e.g., overpassing a size threshold.

In some exemplary embodiments, a semantic deviation that is determined to be below a threshold may not be considered a significant enough difference. For example, a semantic deviation may be considered insignificant if the change does not affect an overall meaning, a context, or the like. In some exemplary embodiments, a significant semantic deviation may include visual modifications to a media record that alter a meaning or context of the media record, auditory modifications to a media record that alter a meaning or context of the media record, cropped portions that alter a meaning or context of the media record, modified portions that alter a meaning or context of the media record, a combination thereof, or the like.

As an example, a user may view a streamed theater show via his smartphone, while a certified body may have recorded the show and stored the record in the certified database. In some exemplary embodiments, in order to determine that the streaming show on the smartphone is authentic, samples from viewed show stream may be compared with fingerprints or keys from the certified database to identify the record. In some exemplary embodiments, upon identifying the matching media record in the certified database, it may be determined that the original show is included in the certified database. In some exemplary embodiments, the retained media record may be aligned to the show stream, and may be continuously or periodically compared to the show stream at the smartphone, e.g., to identify any differences. In some exemplary embodiments, an identified difference that is determined to be a significant semantic or visual difference, such as a swapped face, a cropped portion of importance, a modified face expression modifying a context, or the like, may indicate that the viewed show is fabricated.

In some exemplary embodiments, the comparison may be performed directly between the media streams, frames, or the like, without relying on an approximation thereof, such as an approximation provided by the fingerprints, keys, representations, contexts of segments, a combination thereof, or the like. In some exemplary embodiments, although initial identification of the media stream in the database may be required to be performed efficiently and therefore may rely on fingerprinting techniques, the comparison may be performed directly between the full record and the media stream, e.g., in order to provide a more accurate result. In some exemplary embodiments, the comparison may be performed between two given media files or streams, and even if such comparison may be more computationally intensive than utilizing a mere representation of the media record, the comparison may be performed in relation to a limited number of streams and therefore may not consume much computational resources.

In some exemplary embodiments, the comparison may be performed indirectly between the media streams, frames, or the like, based on extracted content or context which may be associated with one or more frames. In some exemplary embodiments, the certified database may be processed prior to the currently disclosed method, by analyzing each media record, separating each media record to segments having a same context or content, and representing the media record by its extracted contexts. In some exemplary embodiments, the comparison may be performed by identifying a context or content of the media stream and comparing the context to corresponding pre-determined contexts or contents of the media record.

In some exemplary embodiments, the comparison may be performed locally on a user's device that may include or be otherwise associated with the camera or microphone capturing the media stream. In some exemplary embodiments, a locally performed comparison may guaranty full privacy to the user, e.g., as streamed media may not be traceable by a third-party server. However, such a comparison may come at an expense of the device's power supply, computational power, or the like.

In some exemplary embodiments, the comparison may be performed at a different location or platform such as a remote server, a local server, a cloud server, a computing device of the same or different user, or the like. In some exemplary embodiments, the captured media stream may be uploaded from the user's camera to the server, e.g., in real time. In some exemplary embodiments, the server may validate the uploaded media stream by performing a continuous or periodical comparison between the media stream and corresponding portions of the media record. In some exemplary embodiments, utilizing a server to perform the comparison may be time efficient and power efficient, but may reduce a privacy level of the user, e.g., in case the server is public. In some exemplary embodiments, to resolve the privacy issue, the comparison may be performed at a secured server, a server controlled by the user, an edge device of the user, or the like. In some exemplary embodiments, the user-controlled server may provide a similar function to a third-party server, without the loss of privacy associated with the divulgence of what the user is watching to the third-party.

In some cases, a fake database may be generated or obtained, e.g., to include media records that were found to be altered or manipulated. In some cases, prior or in parallel to implementing Step 220, the media samples may be searched for in the fake database, e.g., to identify a corresponding media record therein. In some exemplary embodiments, upon detecting a corresponding media record in the fake database, the media stream may be compared thereto, e.g., in a similar manner to comparing the media sample to the certified database as described in Step 240, to determine whether the media stream is altered. In some exemplary embodiments, in case the media stream matches the record of the fake database, the media stream may be determined to be altered. In some exemplary embodiments, utilizing the fake database may reduce a computational usage when identifying media fabrications.

On Step 250, the media stream may be determined to be manipulated or authentic, e.g., based on the comparison of Step 240. In some exemplary embodiments, based on the comparison between frames or portions of the media record and the media stream, a semantic deviation between the media record and the media stream may or may not be identified. In some exemplary embodiments, the semantic deviation may be identified upon determining that a difference between the media record and the media stream overpasses a difference threshold, upon identifying certain types of differences such as identifying a new or different depicted object altering a context, or the like. In some exemplary embodiments, the semantic deviation may indicate that the digital media stream has been manipulated in one or more modified portions. In some exemplary embodiments, in case the media stream has not been manipulated, no significant semantic deviation that overpasses the difference threshold may be identified. In some exemplary embodiments, insignificant mismatches may relate to differences in resolution, in frame rate, in a volume level, or the like.

In some exemplary embodiments, in case a significant difference is found between the real time media stream and the matching media record, e.g., a semantic difference that modifies a context, an alert or notification may be generated to indicate the content of the media record has been altered in the media stream. In some exemplary embodiments, the semantic deviation may be identified based on an extracted content of the media files or streams. In some exemplary embodiments, the semantic deviation may be identified based on whether or not a semantic meaning, content, context, or intention of the media record was altered by the media stream. For example, in case the media stream omits a portion of the media record such as a start or end thereof, this may cause the media record to be misunderstood, thereby modifying the meaning of the record. In some cases, editing the media record to be put out of context, deepfaking the media record, cropping meaningful portions thereof, or the like, may all be considered as a semantic deviation.

In some exemplary embodiments, a notification, alert, warning, or the like, may be generated and displayed to the user, e.g., via a user device. In some exemplary embodiments, the notification may be provided upon determining that the media stream is semantically manipulated or altered, e.g., by taking the media record out of context. In some exemplary embodiments, the notification may indicate or provide a link to a portion of the media record that includes the unaltered parts of the media stream, a link to missing parts of the media record that are missing in the media stream, to the entire media record, or the like.

Figure 3:
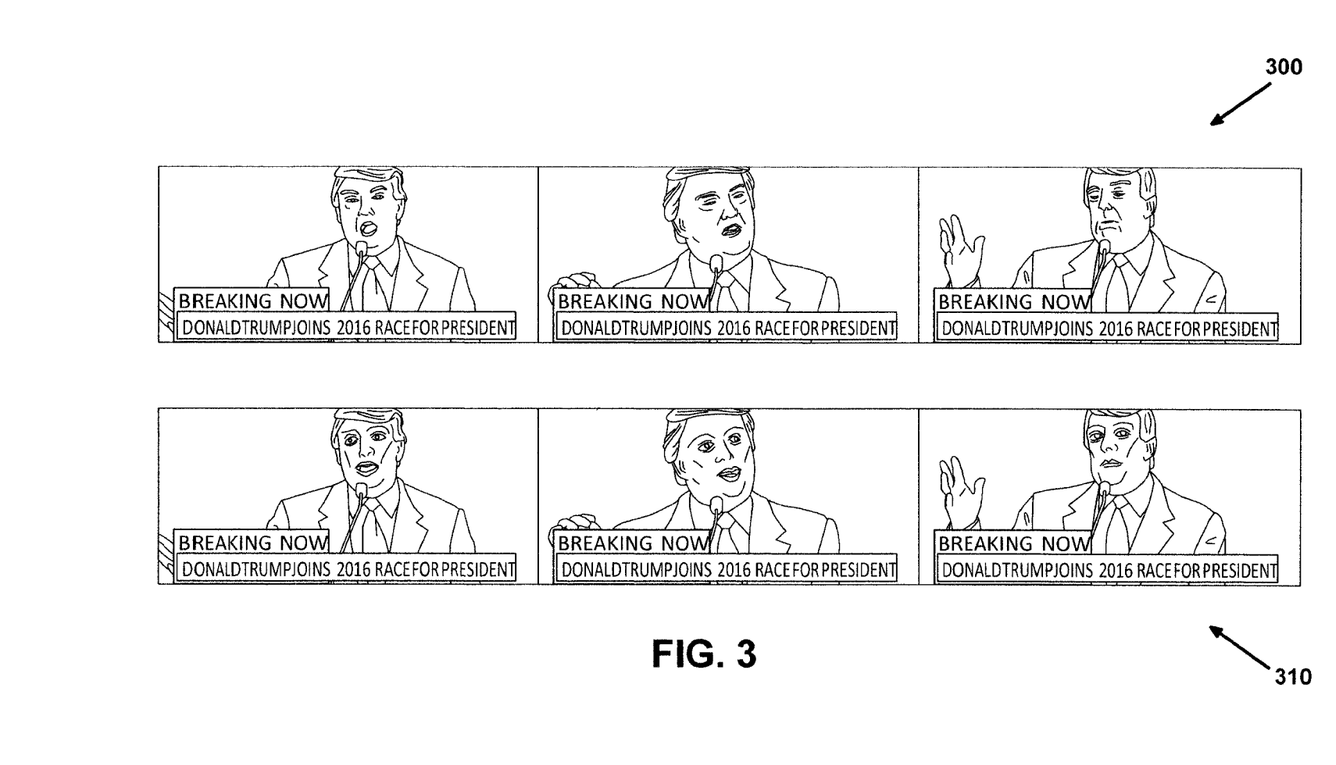
FIG. 3 shows a schematic illustration of an exemplary video record and a corresponding deepfake alteration of the video record, in accordance with some exemplary embodiments of the disclosed subject matter.

Referring now to FIG. 3 showing a schematic illustration of an exemplary video record and a corresponding deepfake alteration of the video record, in accordance with some exemplary embodiments of the disclosed subject matter.

In some exemplary embodiments, Frames 310 may be frames of a media stream, e.g., a video stream. In some exemplary embodiments, Frames 310 may be captured by sensors such as audio and visual sensors of a user device. Alternatively, Frames 310 may be directly rendered in a user device of a user, e.g., via a browser, an application, or the like. In some exemplary embodiments, in the current illustration, Frames 310 depict a speech of the United States president Donald Trump, in an altered deepfake version in which a face of the actor Rowan Atkinson is superimposed over the face of Donald Trump. In some exemplary embodiments, the user operating the user device may desire to authenticate the video stream.

In some exemplary embodiments, in order to authenticate the media stream, a sample thereof may be obtained, e.g., based on one or more portions of Frames 310. In some exemplary embodiments, the sample may be matched to a corresponding record in a certified database, e.g., an original video record including Frames 300. In some exemplary embodiments, the video record may comprise a certified version of the video, such as a video record that was captured by a certified firm, that was software certified, or the like. For example, a news agency that captured and published the video record may be considered a certified agency, rendering the video record to be considered as certified.

In some exemplary embodiments, the video record including Frames 300 may be aligned to a current position of the video stream, and compared thereto to identify a semantic deviation. In some exemplary embodiments, the comparison may comprise comparing the frames in a pixel-level, audio level, or the like. In some exemplary embodiments, the comparison results may indicate that a pixel-level deviation between the videos exists. In some exemplary embodiments, a semantic analyzer may analyze the deviation to determine whether the deviation is a semantic meaningful deviation or not. In some exemplary embodiments, the semantic analyzer may be configured to identify the deviation as an insignificant deviation in certain scenarios such as in case the deviation lies in the resolution level, in a frame rate, in a volume level, or the like. In some exemplary embodiments, the semantic analyzer may identify that the current pixel-level deviation of Frames 310 is associated with an identity of the depicted person, e.g., Donald Trump, thereby identifying a sematic deviation that alters the video record in a meaningful way.

In some exemplary embodiments, in response to identifying the semantic deviation, the user may be notified that the viewed content is not authenticated. In some exemplary embodiments, a link to the original record or to portions thereof may be provided to the user. In some exemplary embodiments, a notification indicating that an identity change is identified may be provided to the user. For example, the notification may contain the message: "the person in the video has a modified face that is different from the original face. Would you like to see the original video with the original face?", or using any other phrasing or indication methods. In case the user indicated he is interested in seeing the original face, the link may be provided, the media record may be extracted and played to the user directly, or the like.

Figure 4:
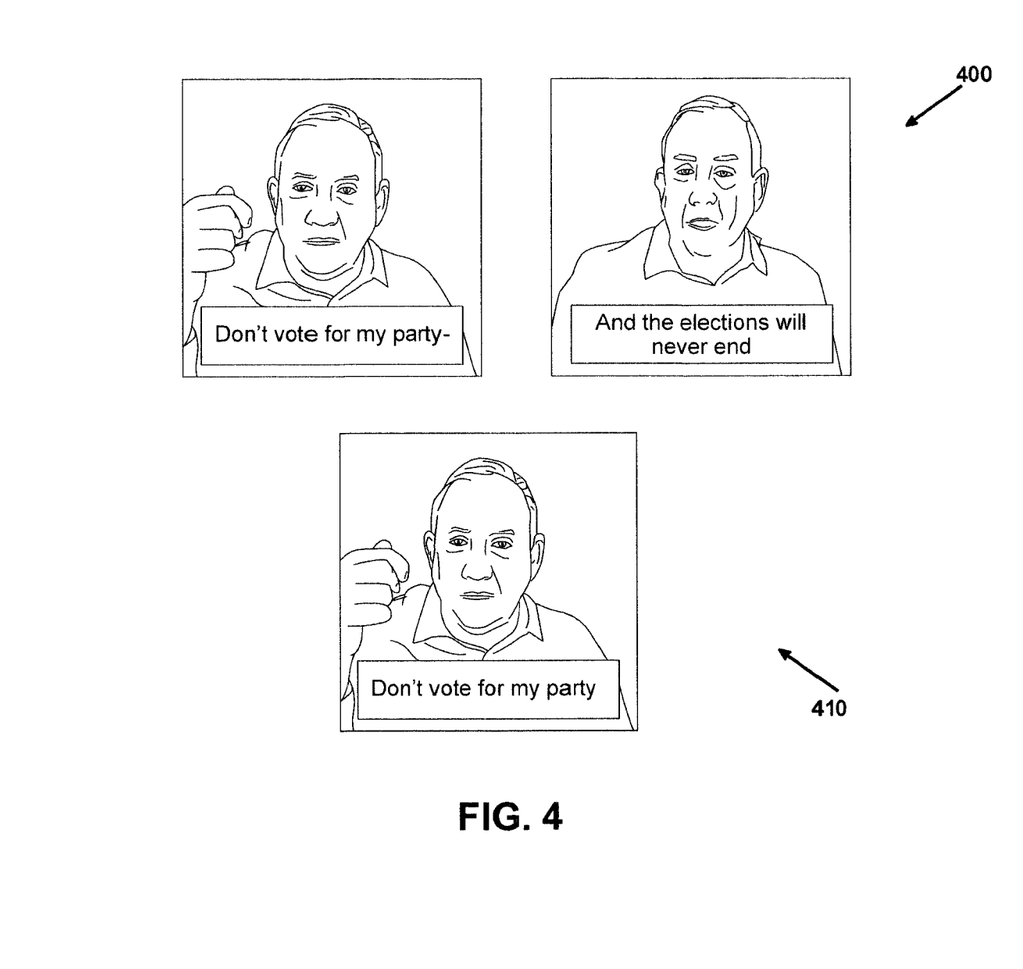
FIG. 4 shows a schematic illustration of an exemplary video record and a corresponding manipulated version of the video record, in accordance with some exemplary embodiments of the disclosed subject matter.

Referring now to FIG. 4 showing a schematic illustration of an exemplary video record and a corresponding manipulated version of the video record, in accordance with some exemplary embodiments of the disclosed subject matter.

In some exemplary embodiments, Frames 410 may be frames of a media stream, e.g., a video stream. In some exemplary embodiments, Frames 410 may be captured by a sensor such as a camera of a user, a microphone, or any other sensor of the user, or may be directly rendered in a user device of a user, e.g., via a browser, an application, or the like. In some exemplary embodiments, in the current illustration, Frames 410 depict a speech of a politician (the Israeli politician Benjamin Gantz, when running for the Sep. 17, 2019 elections), saying "Don't vote for my party". In some exemplary embodiments, the video stream including Frames 410 may include a manipulated version of the original speech, in which the politician says, "Don't vote for my party—and the elections will never end!". In some exemplary embodiments, the manipulation in this case was made by cropping out portions of the video record in a manner that takes the speaker out of context. In some exemplary embodiments, the user operating the user device may desire to authenticate the video stream, e.g., in order to identify whether or not a semantic manipulation was performed thereto.

In some exemplary embodiments, in order to authenticate the video stream, a sample thereof may be obtained, e.g., one or more portions of Frames 410. In some exemplary embodiments, the sample may be matched to a corresponding video record in a certified database, e.g., a video record including Frames 400. In some exemplary embodiments, the video record including Frames 400 may be aligned to a current position of the video stream, and compared thereto to identify deviations.

In some exemplary embodiments, based on the comparison between the video stream and the video record, a deviation may be identified. In some exemplary embodiments, the deviation may be identified as a missing portion at the end of the video record that is cut out from the video stream. In some exemplary embodiments, a semantic analyzer may analyze the deviation by extracting a context of Frames 410 and a context of Frames 400 including the cropped portions. In some exemplary embodiments, the semantic analyzer may identify that the context is modified between the portions, thereby identifying that a semantic deviation has occurred. For example, the context of Frames 410 may be identified as "negative elections", while the context of Frames 400 may be identified as "cause: negative elections, effect: negative timeframe".

In some exemplary embodiments, in response to identifying the semantic deviation, the user may be notified that the viewed content is manipulated. In some exemplary embodiments, a link to the original video record or to the cropped ending portions may be provided to the user, or may be directly played to the user. In some exemplary embodiments, a notification indicating that an ending portion was cropped may be provided. For example, the notification may include the message: "an ending portion altering the meaning of this video is missing. Would you like to see the missing portion?". In case the user indicates he is interested, the link to the missing portion may be provided, the missing portion may be extracted and played to the user directly, or the like.

Figure 5:
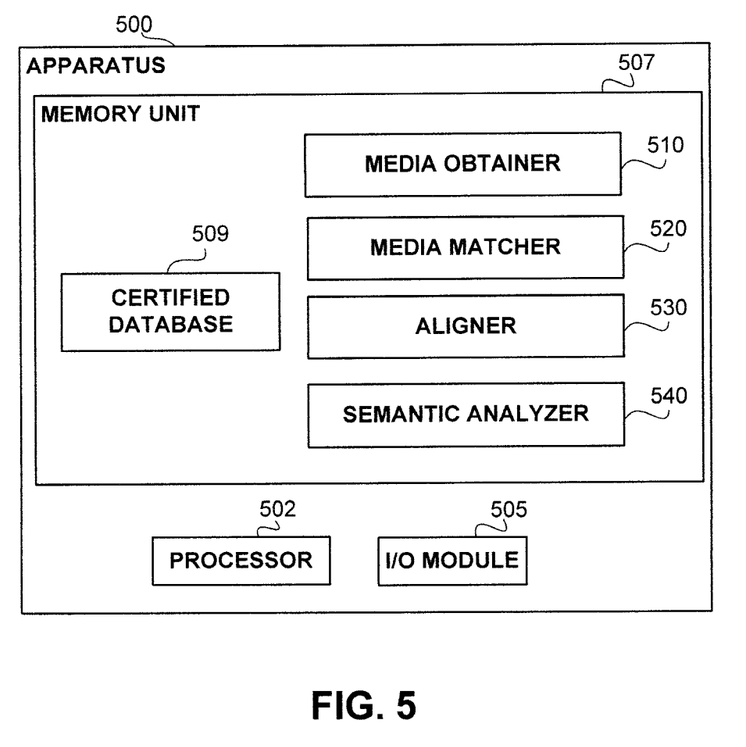
FIG. 5 shows a block diagram of an apparatus, in accordance with some exemplary embodiments of the disclosed subject matter.

Referring now to FIG. 5 showing a block diagram of an apparatus, in accordance with some exemplary embodiments of the disclosed subject matter.

In some exemplary embodiments, an Apparatus 500 may comprise a Processor 502. Processor 502 may be a Central Processing Unit (CPU), a microprocessor, an electronic circuit, an Integrated Circuit (IC) or the like. Processor 502 may be utilized to perform computations required by Apparatus 500 or any of its subcomponents. Processor 502 may be configured to execute computer-programs useful in performing the method of FIG. 2, or the like.

In some exemplary embodiments of the disclosed subject matter, an Input/Output (I/O) Module 505 may be utilized to provide an output to and receive input from a user. I/O Module 505 may be used to transmit and receive information to and from the user or any other apparatus, e.g., a plurality of user devices, which may be in communication therewith.

In some exemplary embodiments, Apparatus 500 may comprise a Memory Unit 507. Memory Unit 507 may be a short-term storage device or long-term storage device. Memory Unit 507 may be a persistent storage or volatile storage. Memory Unit 507 may be a disk drive, a Flash disk, a Random Access Memory (RAM), a memory chip, or the like. In some exemplary embodiments, Memory Unit 507 may retain program code operative to cause Processor 502 to perform acts associated with any of the subcomponents of Apparatus 500. In some exemplary embodiments, Memory Unit 507 may retain program code operative to cause Processor 502 to perform acts associated with any of the Steps in FIG. 2, or the like.

In some exemplary embodiments, Memory Unit 507 may comprise at least one Certified Database 509. In some exemplary embodiments, the Certified Database 509 may comprise a corpus comprising a plurality of media records, such as videos, audio files, or the like. In some exemplary embodiments, Certified Database 509 may be configured to comprise only authenticated media records, a requirement which may be implemented using one or more cryptographical schemes, security measures, hardware or software keys, or the like. In some exemplary embodiments, Certified Database 509 may be located inside or outside of Memory Unit 507, such as at a server, a cloud network, a different computing device of the user, or the like, at a location that is accessible by the Apparatus 500, Processor 502, or the like. In some exemplary embodiments, each media record of the Certified Database 509 may comprise one or more corresponding fingerprints, keys, or the like, which may be configured to uniquely identify the record.

The components detailed below may be implemented as one or more sets of interrelated computer instructions, executed for example by Processor 502 or by another processor. The components may be arranged as one or more executable files, dynamic libraries, static libraries, methods, functions, services, or the like, programmed in any programming language and under any computing environment.

In some exemplary embodiments, Media Obtainer 510 may be configured to obtain a digital media stream or samples therefrom from a media source, e.g., a server, a displayed communication such as on a screen, or the like. Media Obtainer 510 may or may not utilize a camera (not illustrated), a microphone (not illustrated), or the like, for capturing the media stream. In some exemplary embodiments, Media Obtainer 510 may obtain the media stream via I/O Module 505 via one or more communication applications of a user device associated with or housing Apparatus 500, or via any other component or device.

In some exemplary embodiments, Media Matcher 520 may be configured to obtain one or more samples of the captured media stream from Media Obtainer 510, and search for a corresponding media record in Certified Database 509. In some exemplary embodiments, Media Matcher 520 may generate a fingerprint or any other identifier of the samples, and compare the fingerprint with fingerprints of media records in Certified Database 509. In some exemplary embodiments, based on the comparison, Media Matcher 520 may or may not identify the corresponding media record, which may be extracted at least partially from Certified Database 509, e.g., for further processing.

In some exemplary embodiments, Aligner 530 may be configured to obtain the extracted media record from Media Matcher 520, and align or synchronize the record to match the media stream. In some exemplary embodiments, Aligner 530 may first align the media record to the one or more samples, e.g., by finding an offset indicating an end of a location of the sample within the record, with respect to a start of the media record. In some exemplary embodiments, Aligner 530 may next add to the offset an elapsed time indicating a matching time in which the media sample was matched to the media record and a retrieval time for retrieving the media record from Certified Database 509.

In some exemplary embodiments, Semantic Analyzer 540 may be configured to compare, e.g., continuously, periodically, frame by frame, or the like, the aligned media record to the media stream, which may be a real time stream. In some exemplary embodiments, Semantic Analyzer 540 may be configured to perform semantic analysis of the media stream, in order to identify any sematic deviation between the streams, files, or the like. In some exemplary embodiments, Semantic Analyzer 540 may comprise one or more semantic classifiers, voice-to-text translators, visual classifiers, NLP classifiers, or the like, which may be located within Memory Unit 507 or outside of Memory Unit 507, such as at a server, a cloud network, a different computing device of the user, or the like, at a location that is accessible by the Apparatus 500, Processor 502, or the like.

In other exemplary embodiments, Semantic Analyzer 540 may perform semantic analysis in a plurality of alternative contexts. In some exemplary embodiments, a semantic analysis may be performed for handling social media content items such as a textual content item, a video content item, or any other media item. In some exemplary embodiments, non-social media content items may be handled, e.g., content of a webpage of interest. In some exemplary embodiments, a content item may be monitored to identify or detect changes thereof, such as textual edits, audio edits, or the like, and the semantic analysis may be performed by Semantic Analyzer 540 upon identifying a change. In some exemplary embodiments, Semantic Analyzer 540 may be configured to classify the change as being a semantic change having an impact on a meaning of the content item, or as being a non-semantic change, e.g., in a similar manner to Step 240 of FIG. 2.

As an example, in the FACEBOOK™ platform, a user may post a post, with which other users may interact. The interaction may be indicating an emotional reaction such as "like", "wow", "ha-ha", "sad", "care", "angry", or the like. Additionally, or alternatively, the interaction may be posting a comment on the post. Additionally, or alternatively, the interaction may be sharing the post. FACEBOOK™ platform may enable the user to update the post. In response to such an update, Semantic Analyzer 540 may be invoked to analyze the differences between the original content and the updated content and determine whether a meaning of the post has been altered. A semantic deviation may be identified by extracting one or more contexts from the original post, extracting one or more contexts of the edited post, and comparing the contexts. In some exemplary embodiments, upon identifying a semantic deviation, a responsive action may be taken. In some exemplary embodiments, users who previously interacted with the post may be notified of the change, e.g., via an alert, a notification, or the like. As a result, the users may be enabled to act accordingly such by removing their interaction, deleting the comment, un-sharing the post, or the like. In some exemplary embodiments, the platform hosting the post, e.g., a social media platform of FACEBOOK™, may be configured to temporarily put the post on hold, put the interactions therewith on hold, or the like, until an event is identified. In some exemplary embodiments, an interaction may be considered to be put on hold until the users who performed the interactions provide a feedback indicating that the interaction should remain in spite of the change. In some exemplary embodiments, certain identified changes may be classified as inappropriate or undesired changes, which may cause automatic responsive actions such as automatically removing the users' interactions with the post. In some exemplary embodiments, non-semantic deviations may not be indicated to the user, e.g., thereby reducing a number of notifications that are not of interest. In some exemplary embodiments, a machine learning or a deep learning module may be trained in view of users' responses to determine the likelihood that an interaction should remain in view of the specific change. Such module may be utilized to automatically determine activity without user engagement.

It is noted that in FACEBOOK™, as well as in other social networks, the distribution of the post by the platform may depend on the interactions of the audience therewith. As a result, scammers may attempt to put a first post and update its content later on after it gathered sufficient interaction to be well distributed in their view. In accordance with the disclosed subject matter, the distribution of the post by the platform may be dependent only on interactions that are not put on hold. Additionally, or alternatively, the distribution may depend on a rate of approval of the interactions, e.g., if many users (e.g., in absolute numbers or in relative numbers) approve the change within a predetermined timeframe, the distribution may also be based on at least a portion of the non-approved interactions. Additionally, or alternatively, the non-approved interactions may be utilized to determine the distribution using a different weight, such as in a ratio of 1:4, 1:2, 1:10, with interactions that are either approved or performed after the post was edited.

As another example, a YOUTUBE™ post (e.g., a video) may depict a person saying: "elect Simon for president!". A user browsing the YOUTUBE™ website or application may interact with the post, e.g., by clicking on a "like" button. In some exemplary embodiments, the post may be monitored for changes, e.g., by a user device of the user, a social network platform, a designated server, or the like. In some exemplary embodiments, upon identifying the post has been edited to say: "Simon is stupid", a Semantic Analyzer 540 may analyze the change and identify it alters a meaning of the original post. In some exemplary embodiments, the user may be notified of the semantic deviation, the user's interaction (e.g., his "like", comment, share, or the like) may be suspended permanently or temporarily, the post may be suspended permanently or temporarily, or the like. In some exemplary embodiments, the platform hosting the edited content item may modify its count of interactions with the content item upon identifying a change, e.g., so that the social media algorithm treats the modified post as having a reduced number of interactions. In some exemplary embodiments, this may impact a distribution of the modified post, a displayed count of interactions such as a number of likes, or the like. For example, the platform may indicate for an edited post that a certain number of likes are potentially not accurate, not relevant, or the like, via one or more visual or audio cues.

In some exemplary embodiments, a dataset may be generated to include a first class of edits of content items that resulted with a majority of changes of the users' interactions, and a second class of edits of content items that resulted with no changes of the users' interactions. For example, an edited post that caused users to be notified of the change, and received mostly approvals of the change, may be added to the second class, e.g., with an associated score that matches to the percentage of users that approved. In some exemplary embodiments, a classifier may be trained on the dataset to classify edits of content items as relevant or irrelevant, where relevant edits are expected to cause a change in the users' behavior, while irrelevant edits are expected not to cause any change. In some exemplary embodiments, a notification policy configured to notify users of post edits may consider the classification of the post edits as relevant or irrelevant, e.g., thereby minimizing user notifications that are expected to result with approvals.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-transitory computer readable storage medium retaining program instructions, which program instructions when read by a processor, cause the processor to:
   obtain a media sample of a media stream;
   retrieve from a database a media record that matches the media sample of the media stream;
   align the media record with the media stream, wherein aligning the media record comprises determining an offset from a start of the media record;
   compare the media stream with the media record according to the offset; and
   upon identifying a semantic deviation between the media stream and the media record, determine that the media stream is semantically manipulated, wherein said identifying the semantic deviation comprises determining that the media stream comprises a deepfake variation of the media record.

2. The computer program product of claim 1, wherein the semantic deviation comprises a semantic manipulation that alters a meaning of the media record.

3. The computer program product of claim 1, wherein the semantic deviation is identified by:
   utilizing a semantic classifier to extract a first context of the media record,
   utilizing the semantic classifier to extract a second context of the media stream, and
   comparing the first context and the second context.

4. The computer program product of claim 1, wherein said identifying the semantic deviation comprises identifying that the semantic deviation is an outcome of at least one of the group consisting of: a visual modification to the media record, an auditory modification to the media record, or cropping of a portion of the media record.

5. The computer program product of claim 1, wherein the instructions, when read by the processor, cause the processor to authenticate the media stream upon determining that the media stream and the media record are semantically identical.

6. The computer program product of claim 1, wherein the database comprises a certified database retaining certified media, wherein the certified media comprises at least one of: hardware-certified media, software-certified media, media that was recorded by an authorized recording center, or personal media of a person that was certified by the person.

7. The computer program product of claim 1, wherein the retrieval of the media record comprises:
   extracting a fingerprint from the media sample, wherein the media stream comprises a real time media stream that is broadcasted in real time, wherein the media sample is extracted from the real time media stream, and
   matching the fingerprint of the media sample against fingerprints of records in the database, thereby enabling to identify the media record for retrieval.

8. The computer program product of claim 1, wherein said obtain is performed at a sensor comprising at least one of the group consisting of: a camera and a microphone.

9. The computer program product of claim 8, wherein the sensor is integrated as part of an augmented reality device worn by a user.

10. The computer program product of claim 9, wherein said obtain, said retrieve, said align, and said compare are performed at the augmented reality device, wherein the augmented reality device is configured to identify that the media stream is displayed on a screen in a perceived environment of the user.

11. The computer program product of claim 1, wherein said obtain is performed at an augmented reality device communicating with a server, wherein the augmented reality device is configured to obtain the media stream from the server and add the media stream to an augmented reality stream presented to a user of the augmented reality device.

12. The computer program product of claim 1, wherein said obtain comprises communicating between a user device and a server to obtain the media stream and rendering the media stream in the user device.

13. The computer program product of claim 1, wherein upon determining that the media stream is semantically manipulated, the instructions, when read by the processor, cause the processor to generate an alert to be displayed to a user via a user device.

14. A computer program product comprising a non-transitory computer readable storage medium retaining program instructions, which program instructions when read by a processor, cause the processor to:
   obtain a media sample of a media stream;
   retrieve from a database a media record that matches the media sample of the media stream;
   align the media record with the media stream, wherein aligning the media record comprises determining an offset from a start of the media record;
   compare the media stream with the media record according to the offset;

upon identifying a semantic deviation between the media stream and the media record, determine that the media stream is semantically manipulated; and upon determining that the media stream and the media record are semantically identical, authenticate the media stream, wherein the determination that the media stream and the media record are semantically identical comprises identifying that the media stream comprises a non-sematic deviation from the media record, wherein the non-sematic deviation comprises at least one of: a resolution level deviation, a volume deviation, an audio quality variation, or a frame rate deviation.

15. A computer program product comprising a non-transitory computer readable storage medium retaining program instructions, which program instructions when read by a processor, cause the processor to:

obtain a media sample of a media stream;

retrieve from a database a media record that matches the media sample of the media stream;

align the media record with the media stream, wherein aligning the media record comprises determining an offset from a start of the media record, wherein said determining the offset comprises:
  identifying a first location of the media sample within the media record,
  determining a time elapsed until the media sample was matched to the media record and the media record was retrieved from the database, and
  determining the offset to be located at a second location, wherein the second location is determined based on the first location and the elapsed time;

compare the media stream with the media record according to the offset; and upon identifying a semantic deviation between the media stream and the media record, determine that the media stream is semantically manipulated.

16. A computer program product comprising a non-transitory computer readable storage medium retaining program instructions, which program instructions when read by a processor, cause the processor to:

obtain a media sample of a media stream, wherein said obtain is performed at a sensor comprising at least one of the group consisting of: a camera and a microphone, wherein the sensor is integrated as part of a user device operated by a user;

retrieve from a database a media record that matches the media sample of the media stream;

align the media record with the media stream, wherein aligning the media record comprises determining an offset from a start of the media record;

compare the media stream with the media record according to the offset; and upon identifying a semantic deviation between the media stream and the media record, determine that the media stream is semantically manipulated, wherein said obtain, said retrieve, said align, said compare, and said determine are performed at the user device.

17. A computer program product comprising a non-transitory computer readable storage medium retaining program instructions, which program instructions when read by a processor, cause the processor to:

obtain a media sample of a media stream;

retrieve from a database a media record that matches the media sample of the media stream;

align the media record with the media stream, wherein aligning the media record comprises determining an offset from a start of the media record;

compare the media stream with the media record according to the offset;

upon identifying a semantic deviation between the media stream and the media record, determine that the media stream is semantically manipulated; and upon determining that the media stream is semantically manipulated, generate an alert to be displayed to a user via a user device, wherein said displaying the alert comprises at least one of:

displaying the media record;

displaying a portion of the media record that is cropped from the media stream; and displaying a notification that the media stream is an alteration of the media record.

18. A method comprising:

obtaining a media sample of a media stream;

retrieving from a database a media record that matches the media sample of the media stream;

aligning the media record with the media stream, wherein aligning the media record comprises determining an offset from a start of the media record;

comparing the media stream with the media record according to the offset; and upon identifying a semantic deviation between the media stream and the media record, determining that the media stream is semantically manipulated, wherein said identifying the semantic deviation comprises determining that the media stream comprises a deepfake variation of the media record.

19. A system comprising a processor and coupled memory, the processor being adapted to:

obtain a media sample of a media stream;

retrieve from a database a media record that matches the media sample of the media stream;

align the media record with the media stream, wherein aligning the media record comprises determining an offset from a start of the media record;

compare the media stream with the media record according to the offset; and upon identifying a semantic deviation between the media stream and the media record, determine that the media stream is semantically manipulated, wherein said identifying the semantic deviation comprises determining that the media stream comprises a deepfake variation of the media record.

* * * * *